(12) United States Patent
Araki et al.

(10) Patent No.: US 8,072,518 B2
(45) Date of Patent: Dec. 6, 2011

(54) SOLID-STATE IMAGING DEVICE, DRIVING CONTROL METHOD THEREOF, AND IMAGING APPARATUS

(75) Inventors: Yuichiro Araki, Fukuoka (JP); Takahisa Ueno, Kanagawa (JP); Junichi Iutsuka, Nagasaki (JP); Nozomu Takatori, Nagasaki (JP); Yasuaki Hisamatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 530 days.

(21) Appl. No.: 12/235,698

(22) Filed: Sep. 23, 2008

(65) Prior Publication Data
US 2009/0086067 A1 Apr. 2, 2009

(30) Foreign Application Priority Data
Sep. 28, 2007 (JP) .................... 2007-253354

(51) Int. Cl.
*H04N 3/14* (2006.01)
*H04N 5/335* (2006.01)
(52) U.S. Cl. ........ 348/294; 348/297; 348/302; 348/301; 348/312

(58) Field of Classification Search .................. 348/294, 348/297, 301, 312; 250/208.1; 257/290–292
See application file for complete search history.

(56) References Cited

FOREIGN PATENT DOCUMENTS
JP 62292013 A * 12/1987
JP 2005-278135 10/2005

* cited by examiner

*Primary Examiner* — Yogesh Aggarwal
(74) *Attorney, Agent, or Firm* — SNR Denton US LLP

(57) ABSTRACT

A solid-state imaging includes a comparing circuit, an inverting circuit, and a masking circuit, and performs column parallel AD conversion processing of analog pixel signals outputted from a plurality of pixels arranged in a two-dimensional matrix form. The comparing circuit outputs a difference signal obtained by comparing each of the pixel signals outputted from the pixels with a reference signal having a ramp waveform. The inverting circuit inverts a logic of the difference signal outputted from the comparing circuit. The masking circuit masks an output of an output signal of the inverting circuit to a circuit in a subsequent stage during an input offset canceling period in which the comparing circuit is canceling an input offset between the pixel signal and the reference signal.

3 Claims, 6 Drawing Sheets

Related Art  F I G . 1
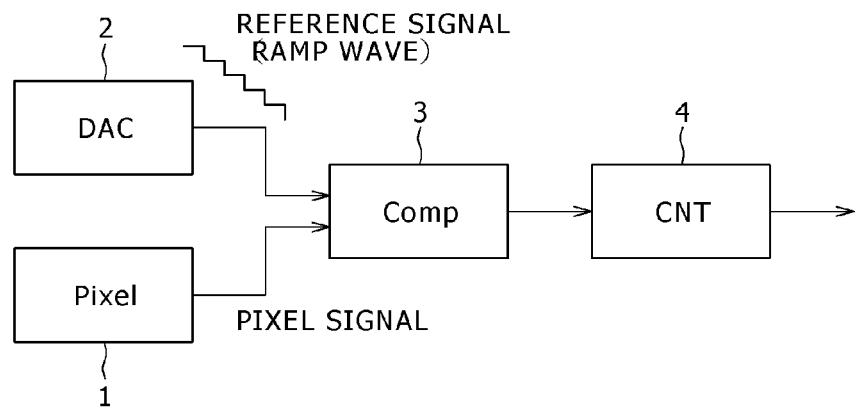
F I G . 2
Related Art
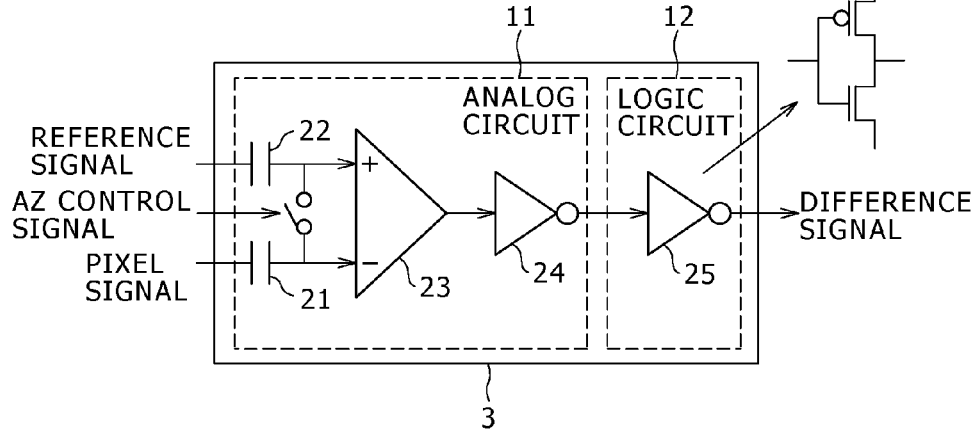

SOLID-STATE IMAGING DEVICE, DRIVING CONTROL METHOD THEREOF, AND IMAGING APPARATUS

CROSS-REFERENCE TO RELATED APPLICATIONS

The present application claims benefit of priority of Japanese patent Application No. 2007-253354 filed in the Japanese Patent Office on Sep. 28, 2007, the entire disclosure of which is incorporated herein by reference.

BACKGROUND OF THE INVENTION

1. Field of the Invention

The present invention relates to a solid-state imaging device, a driving method thereof, and an imaging apparatus using the same.

2. Description of Related Art

As solid-state imaging devices, there have been proposed complementary metal oxide semiconductor (CMOS) image sensors implementing a column-parallel AD conversion scheme (hereinafter called "column AD conversion scheme") in which pixels are two-dimensionally arranged in a matrix form with one Analog-to-Digital converter (ADC) provided for each column.

Furthermore, in recent years, CMOS image sensors implementing a column AD conversion scheme suitably improved for image pickup at high-speed have been proposed. For example, Japanese Unexamined Patent Application Publication No. 2005-278135 discloses a CMOS image sensor implementing a column AD conversion scheme, which has achieved higher frame rate and high resolution without increasing its circuitry scale by using an up/down counter.

FIG. 1 shows a simple configuration example of the CMOS image sensor implementing a column AD conversion scheme, in which a pixel signal of each of the pixels arranged two-dimensionally in a matrix form are inputted to the up/down counter.

A pixel (Pixel) 1 supplies an analog pixel signal responsive to an amount of light received, to a voltage comparing unit (Comp) 3. The voltage comparing unit 3 also receives a reference signal from a digital-to-analog converter (DAC) 2 as a reference voltage supplying circuit. The reference signal has a so-called ramp (RAMP) waveform in which a level (voltage) changes with time in the form of a ramp.

The voltage comparing unit 3 outputs a difference signal obtained by comparing the pixel signal from the pixel 1 with the reference signal from the DAC 2, to an up/down counter (CNT) 4. For example, if the reference signal is larger than the pixel signal, a Hi (High) difference signal is supplied to the up/down counter 4, whereas if the reference signal is smaller than the pixel signal, a Lo (Low) difference signal is supplied to the up/down counter 4.

During a Pre-Charge Phase (P-phase) ADC enable period, the up/down counter (CNT) 4 down-counts only a period in which the Hi difference signal is supplied. During a Data Phase (D-phase) ADC enable period, the up-down counter 4 up-counts only a period in which the Hi difference signal is supplied. The P-phase ADC enable period is a period for measuring a reset component ΔV which is a fluctuation component of the pixel 1, whereas the D-phase ADC enable period is a period for measuring (signal component Vsig+ reset component ΔV). By combining a count during the P-phase ADC enable period and a count during the D-phase ADC enable period, only the signal component Vsig is obtained from (signal component Vsig+reset component ΔV)−(reset component ΔV). This is how CDS processing is achieved.

FIG. 2 is a schematic diagram showing a detailed configuration of the voltage comparing unit 3.

The voltage comparing unit 3 includes an analog circuit 11 and a logic circuit (digital circuit) 12.

In the analog circuit 11, the pixel signal from the pixel 1 is inputted to a comparator 23 via a capacitive element 21, and the reference signal from the DAC 2 is inputted to the comparator 23 via a capacitive element 22. The comparator 23 outputs the difference signal between the pixel signal and the reference signal, and an inverter 24 inverts and amplifies the difference signal, and outputs the resultant signal to the logic circuit 12.

In the logic circuit 12, the difference signal from the inverter 24 of the analog circuit 11 is inverted and amplified by an inverter 25, and the resultant signal is outputted to the up/down counter 4. The inverter 25 can be constructed by combining, e.g., a PMOS transistor and an NMOS transistor.

In the voltage comparing unit 3 constructed above, a pre-processing for generating the difference signal is performed to cancel an input offset between the pixel signal and the reference signal. The preprocessing is a processing for bringing two input nodes of the comparator 23 into conduction. This processing is called "autozero (AZ) processing".

Referring to FIGS. 3A and 3B, signals within the voltage comparing unit 3 during the CDS processing and the AZ processing which is a pre-processing thereof will be described. FIG. 3A is a schematic diagram showing a configuration of the voltage comparing unit 3, and FIG. 3B is a waveform diagram showing the circuit operation of a pixel.

During an AZ processing period, an AZ control signal becomes active (High), thereby making the potentials of the pixel signal and the reference signal inputted to the comparator 23 equal to cancel the input offset therebetween. It is noted in FIG. 3B that the vertical axis is common to the pixel signal and the reference signal and that the pixel signal overlaps with the reference signal having the same potential during periods indicated by a dotted line in which the pixel signal is not shown.

In the up/down counter 4 of the subsequent stage, down-counting is performed during a period in which the reference signal is larger than the pixel signal, of the P-phase ADC enable period defined by a P-phase ADC enable pulse(not shown), and up-counting is performed during a period in which the reference signal is larger than the pixel signal, of the D-phase ADC enable period defined by a D-phase ADC enable pulse(not shown).

SUMMARY OF THE INVENTION

When the pixel signal and the reference signal have the same potential, a difference signal having an intermediate potential is outputted from the analog circuit 11. When the difference signal having the intermediate potential is inputted to the inverter 25, a through current passes through the inverter 25 formed by combining the PMOS transistor and the NMOS transistor, as shown in FIG. 3A. The difference signal attributable to this through current is an unnecessary signal, and thus the device consumes wasteful power.

Accordingly, it is desirable to reduce power consumption by suppressing the through current flowing when the input offset between the pixel signal and the reference signal is cancelled.

In accordance with one aspect of the present invention, there is provided a solid-state imaging device which performs column parallel AD conversion processing of analog pixel signals outputted from a plurality of pixels arranged in a two-dimensional matrix form. The solid-state imaging device includes a comparing circuit, an inverting circuit, and a masking circuit. The comparing circuit outputs a difference signal obtained by comparing each of the pixel signals outputted from the pixels with a reference signal having a ramp waveform. The inverting circuit inverts a logic of the difference signal outputted from the comparing circuit. The masking circuit masks an output of an output signal of the inverting circuit to a circuit in a subsequent stage during an input offset canceling period in which the comparing circuit is canceling an input offset between the pixel signal and the reference signal.

In accordance with another aspect of the present invention, there is provided a driving control method for a solid-state imaging device which includes a comparing circuit configured to output a difference signal obtained by comparing an analog pixel signal outputted from a pixel with a reference signal having a ramp waveform, an inverting circuit for inverting a logic of the difference signal outputted from the comparing circuit, and a masking circuit configured to mask an output of an output signal of the inverting circuit to a circuit in a subsequent stage during an input offset canceling period in which the comparing circuit is canceling an input offset between the pixel signal and the reference signal, thereby performing column parallel AD conversion processing of a plurality of the pixels arranged in a two-dimensional matrix form. The driving control method includes the steps of: canceling, in the comparing circuit, an input offset between the pixel signal and the reference signal, in the comparing circuit; and masking, in the masking circuit, an output of the output signal of the inverting circuit to a circuit in a subsequent stage during an input offset canceling period in which the comparing circuit is canceling the input offset.

In accordance with a further aspect of the present invention, there is provided an imaging apparatus which includes a solid-state imaging device configured to perform column parallel AD conversion processing of analog pixel signals outputted from a plurality of pixels arranged in two-dimensional matrix form. The solid-state imaging device includes a comparing circuit, an inverting circuit, and a masking circuit. The comparing circuit outputs a difference signal obtained by comparing each of the pixel signals outputted from the pixels with a reference signal having a ramp waveform. The inverting circuit inverts a logic of the difference signal outputted from the comparing circuit. The masking circuit masking an output of an output signal of the inverting circuit to a circuit in a subsequent stage during an input offset canceling period in which the comparing circuit is canceling an input offset between the pixel signal and the reference signal.

In embodiments of the present invention, the output of the output signal from the inverting circuit to a circuit in the subsequent stage during the input offset canceling period in which the comparing circuit is canceling the input offset between the pixel signal and the reference signal is masked.

According to embodiments of the present invention, power consumption can be reduced.

Furthermore, according to embodiments of the present invention, a through current flowing during the cancellation of the input offset between the pixel signal and the reference signal can be suppressed.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

FIG. 1 is a block diagram showing a simple configuration example of a known CMOS image sensor implementing a column AD conversion scheme;

FIG. 2 is a schematic diagram showing a detailed configuration of a voltage comparing unit of FIG. 1;

DETAILED DESCRIPTION OF EMBODIMENTS

While embodiments of the present invention will be described below, constituent elements of the present invention correspond, by way of example, to the embodiments described in the present specification or the drawings as follows. This description is to confirm that the embodiments supporting the present invention are described in the present specification or the drawings. Accordingly, even if there is an embodiment which is described in the present specification or the drawings but not described herein as the embodiment corresponding to a constituent element of the present invention, this does not mean that the embodiment does not correspond to the constituent element of the present invention. Conversely, even if an embodiment is described herein as corresponding to a constituent element, this does not mean that the embodiment does not correspond to any essential component other than the constituent element.

A solid-state imaging device according to an embodiment of the present invention is a solid-state imaging device (e.g., a solid-state imaging device 51 of FIG. 4) performs column parallel AD conversion processing of analog pixel signals outputted from a plurality of pixels arranged in a two-dimensional matrix form. The sold-state imaging device includes a comparing circuit (e.g., a comparator 23 of FIG. 5) which outputs a difference signal obtained by comparing each of the pixel signals outputted from the pixels with a reference signal having a ramp waveform, an inverting circuit (e.g., an inverter 24 of FIG. 5) for inverting a logic of the difference signal outputted from the comparing circuit, a masking circuit (e.g., a NAND circuit 101 of FIG. 5) which masks an output of an output signal of the inverting circuit to a circuit in a subsequent stage during an input offset canceling period in which an offset between the pixel signal and the reference signal is canceled.

Embodiments of the present invention will be described below with reference to the drawings.

Figure 3A:
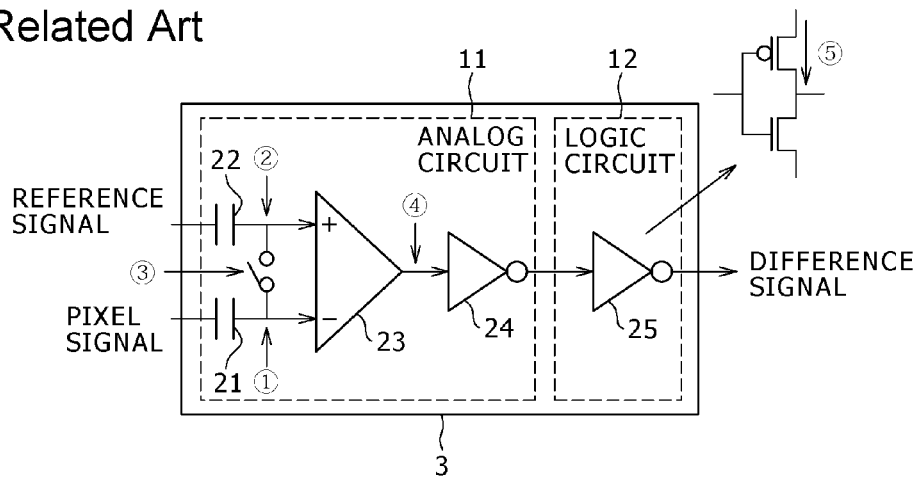
FIGS. 3A and 3B are diagrams each illustrating an existing issue.
Figure 3B:
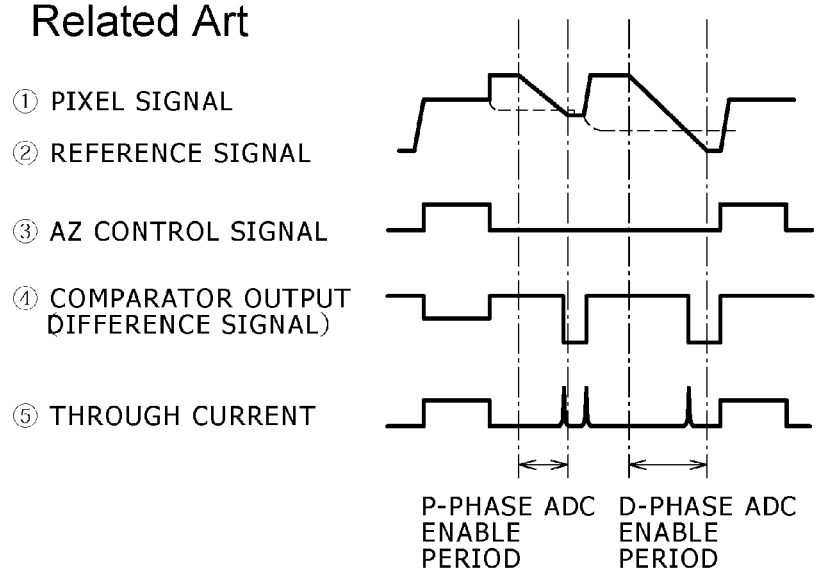
Figure 4:
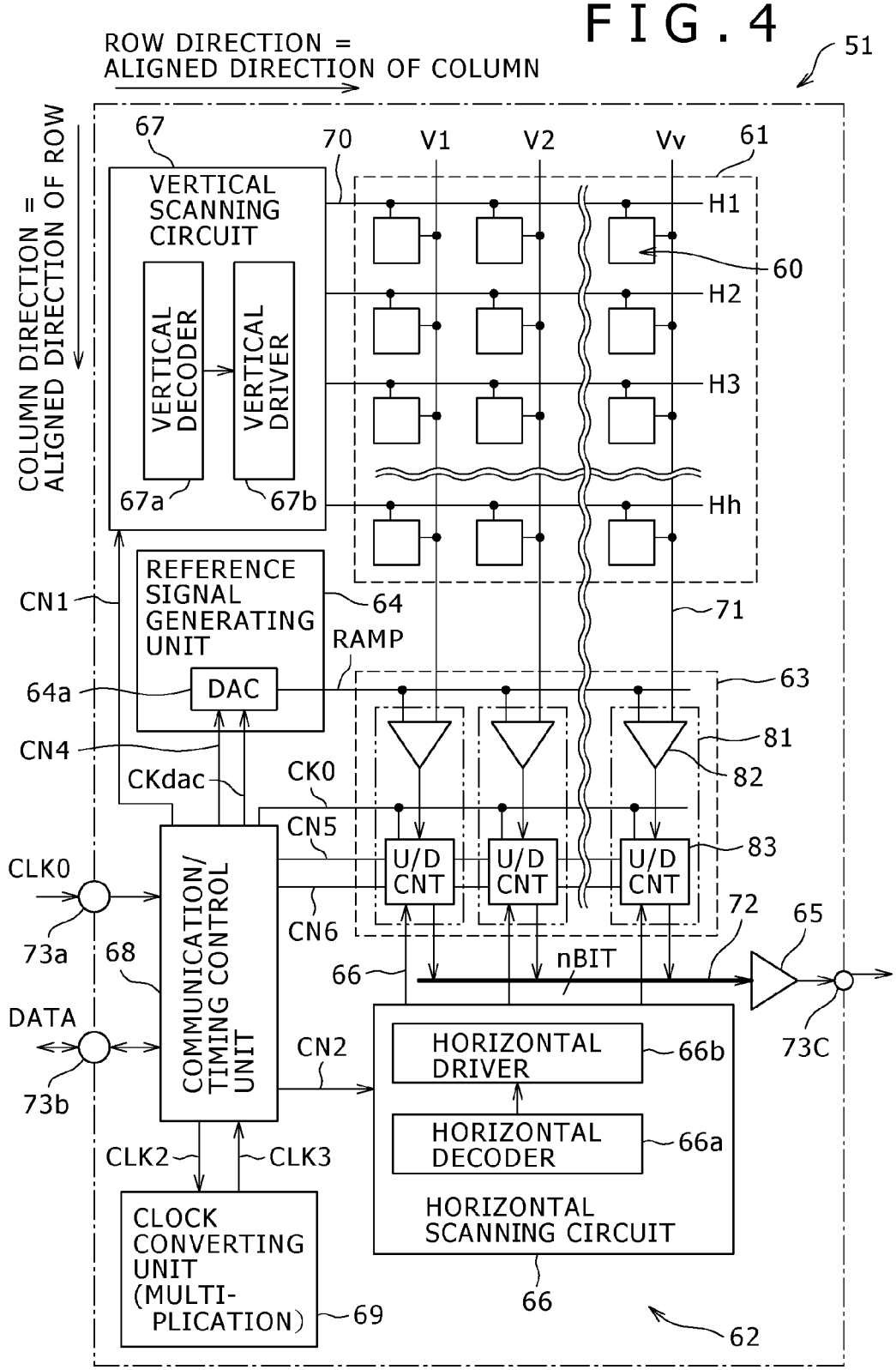
FIG. 4 is a block diagram showing a configuration example of an embodiment of a solid-state imaging device to which an embodiment of the present invention is applied.

FIG. 4 is a block diagram showing a configuration example of an embodiment of a CMOS solid-state imaging device (CMOS image sensor) to which the present invention is applied.

The solid-state imaging device 51 includes an imaging unit having a plurality of pixels arranged in rows and columns (e.g., in a two-dimensional matrix form) each including a photoelectric conversion element (as an example of a charge generating portion), such as a photodiode, for outputting an electrical signal responsive to an amount of incident light. The solid-state imaging device 51 includes a signal processing unit having column-parallel arrangement. Each signal processing unit performs processing on a pixel signal (voltage signal) outputted from the corresponding pixel, such as correlated double sampling (CDS) processing and analog-to-digital converter(ADC) processing.

The solid-state imaging device 51 includes a pixel portion 61 as the imaging unit, in which a plurality of square unit pixels 60 are arranged in rows and columns (in the two-dimensional matrix form), a driving control unit 62 provided outside the pixel portion 61, a column processing unit 63 for performing column parallel signal processing, a reference signal generating unit 64 for supplying a reference signal for AD conversion to the column processing unit 63, and an output circuit 65.

The driving control unit 62 includes a horizontal scanning circuit 66 for controlling column addressing and column scanning, a vertical scanning circuit 67 for controlling row addressing and row scanning, a communication/timing control unit 68 having functions such as generating internal clocks, and a clock converting unit 69 for generating pulses having high-speed clock frequencies, thereby performing control for sequentially reading out the pixel signals.

In the pixel portion 61, a unit pixel 60 typically includes a photodiode as a light-receiving element (charge generating unit) and an in-pixel amplifier having an amplification semiconductor (for example, transistor).

The in-pixel amplifier is of, e.g., a floating diffusion amplifying configuration. In one example, a "4TR" configuration using four general-purpose transistors can be used as the CMOS sensor, which includes, with respect to a charge producing unit, a read selection transistor being one example of a charge reading unit (transfer gate unit/reading gate unit), a reset transistor being one example of a reset gate unit, a vertical selection transistor, and an amplification transistor of a source-follower configuration being one example of a sensing element sensing potential change of a floating diffusion.

Alternatively, as disclosed in Japanese Patent Publication No. 2708455, a "3TR" configuration can be used, which includes three transistors, i.e., an amplification transistor connected to a drain line (DRN) for amplifying a signal voltage corresponding to signal charges produced by a charge producing unit, a reset transistor for resetting the charge producing unit, a read selection transistor (transfer gate unit) to be scanned by a vertical shift register via transfer interconnection (TRF).

Each unit pixel 60 is connected to both the vertical scanning circuit 67 via a row control line 70 for selecting a row, and the column processing unit 63 in which a column AD circuit 81 is arranged for each vertical column via a vertical signal line 71. Here, each row control line 70 represents interconnection in general which connects to the corresponding unit pixel 60 from the vertical scanning circuit 67.

The horizontal scanning circuit 66 and the vertical scanning circuit 67 start reading out pixel signals from unit pixels 60 to be processed, in response to control signals CN1 and CN2 given from the communication/timing control unit 68. As a result, various pulse signals (e.g., a reset pulse RST, a transfer pulse TRF, a DRN control pulse DRN, and the like) for driving each unit pixel 60 are supplied to the unit pixel from the vertical scanning circuit 67 via the corresponding row control line 70.

The communication/timing control unit 68 has a function as a timing generator TG for supplying clocks and predetermined pulse signals required for operation of various parts. The communication/timing control unit 68 also receives a mater clock CLK0 via a terminal 73*a* and data DATA commanding an operation mode and the like via a terminal 73*b*, and also has a function as a communication interface outputting data containing information on the solid-state imaging device 51.

For example, the communication/timing control unit 68 supplies a horizontal address signal to a horizontal decoder 66*a*, and a vertical address signal to a vertical decoder 67*a*. In doing so, since the unit pixels 60 are arranged in the two-dimensional matrix form, (vertical) scan-reading is performed by accessing and capturing analog pixel signals outputted in a column direction via the vertical signal lines 71 in units of rows (column-parallelly), and thereafter (horizontal) scan-reading is performed by accessing in a row direction being a vertical column arrangement direction to read pixel signals (digitized pixel data in this embodiment) to an output side. By doing so, a readout process for the pixel signals or pixel data at higher-speed can be achieved. The readout process includes, not limited to the scan-reading, a random accessing in which the unit pixels 60 desired to be read out are addressed directly to read out only information on the necessary unit pixels 60.

Furthermore, the communication/timing control unit 68 supplies a clock CLK1 having the same frequency as that of the master clock CLK0 inputted via the terminal 73*a*, a clock obtained by dividing the clock CLK1 by 2, and other clocks having lower frequencies obtained by dividing an input frequency by any number larger than 2, to various parts within the device, e.g., the horizontal scanning circuit 66, vertical scanning circuit 67, column processing unit 63, and the like. Clocks such as the divided-by-two clock and the lower-frequency clocks are hereinafter called collectively as "low-speed clock CLK2".

The clock converting unit 69 incorporates a multiplier for generating pulses having a clock frequency higher than an input clock frequency. The clock converting unit 69 receives a low-speed clock CLK2 from the communication/timing control unit 68, and generates therefrom a clock having a frequency not less than double the input frequency. The multiplier of the clock converting unit 69 may be a k1 multiplier where k1 is a multiple of the frequency of the low-speed clock CLK2, and thus various circuits can be used.

The vertical scanning circuit 67 selects a row of the pixel portion 61, and supplies pulses required for that row. The vertical scanning circuit 67 includes a vertical decoder 67*a* for determining (selecting the row of the pixel portion 61) the row for reading out in a vertical direction, and a vertical driver 67*b* for driving unit pixels 60 on read addresses (in the vertical direction) determined by the vertical decoder 67*a*, by supplying pulses to a corresponding row control line 70. The vertical decoder 67*a* can select, e.g., a row for electronic shuttering, in addition to a row for reading signals.

The horizontal scanning circuit 66 selects in turn one column AD circuit 81 of the column processing unit 63 in synchronism with the low-speed clock CLK2, and outputs the selected signal to horizontal signal lines (horizontal output lines) 72. The horizontal scanning circuit 66 includes a horizontal decoder 66*a* for determining (selecting individual column AD circuits 81 within the column processing unit 63) columns for reading out in a horizontal direction, and a horizontal driver 66*b* for inputting each of the signals in the column processing unit 63 to the corresponding horizontal signal lines 72 in accordance with a read address determined by the horizontal decoder 66*a*. It is noted that as many horizontal signal lines 72 as, e.g., a number of bits n (n being a positive integer) handled by the column AD circuit 81 are arranged. For example, for 10 (=n) bits, 10 horizontal signal lines 72 are arranged.

The reference signal generating unit 64 includes a DA converter (digital-to-analog converter(DAC)) 64*a*, generates a reference signal having a ramp waveform from an initial value represented by control data CN4 from the communication/timing control unit 68, in synchronism with a count clock CKdac from the communication/timing control unit 68, and supplies the generated reference signals to the individual column AD circuits 81 of the column processing unit 63.

The column AD circuits 81 convert pixel signals supplied thereto from unit pixels 60 into n-bit pixel data for each of the row control lines 70 (H0, H1, ... ). Each column AD circuit 81 includes a voltage comparing unit (comparator) 82 and a counter unit 83. The voltage comparing unit 82 compares a reference signal generated at the DA converter 64a of the reference signal generating unit 64 with a corresponding one of the analog pixel signals obtained via the vertical signal lines 71 (V0, V1, ... ) from the unit pixels 60 for each of the row control lines 70 (H0, H1, ... ). The counter unit 83 counts a time interval until the voltage comparing unit 82 completes the comparison processing and holding the result.

The counter unit 83 is supplied with a mode control signal CN5 for instructing whether the counter unit 83 operates in a down-count mode or an up-count mode, and a reset control signal CN6 for resetting a count held by the counter unit 83 into an initial value, from the communication/timing control unit 68. The counter unit 83 is also supplied with a count clock CK0 from the communication/timing control unit 68.

The counter unit 83 performs counting processing by switching down-count operation and up-count operation on pixel signals for the same processing or on pixel signals of the same physical characteristic, in accordance with the mode control signal CN5, using an up/down counter (U/D CNT).

The counter unit 83 receives a control pulse via a control line 66c from the horizontal scanning circuit 66. The counter unit 83 has a latch function of holding a counted result, and holds the counter output value until an instruction with the control pulse is received via the control line 66c.

The column AD circuit 81 performs counting operation, and outputs the counted result at a predetermined timing. Namely, first, the voltage comparing unit 82 compares a reference signal from the reference signal generating unit 64 with a pixel signal supplied thereto via the vertical signal line 71. Then, when both voltages become equal, a comparator output of the voltage comparing unit 82 is inverted (changes from Hi to Lo in this embodiment).

The counter unit 83 has already started the counting operation in either the down-count mode or the up-count mode in synchronism with the count clock CK0, and completes the counting operation and latches (holds and stores) the counted value at that point of the operation as pixel data, upon notification of information on inversion of the comparator output from the counter unit 83.

The counter unit 83 outputs the stored and held pixel data sequentially to the output circuit 65, on the basis of shifting operation by horizontal selection signals supplied thereto from the horizontal scanning circuit 66 via the control lines 66c at predetermined timings. The output circuit 65 outputs the supplied pixel data from an output terminal 73c.

Figure 5:
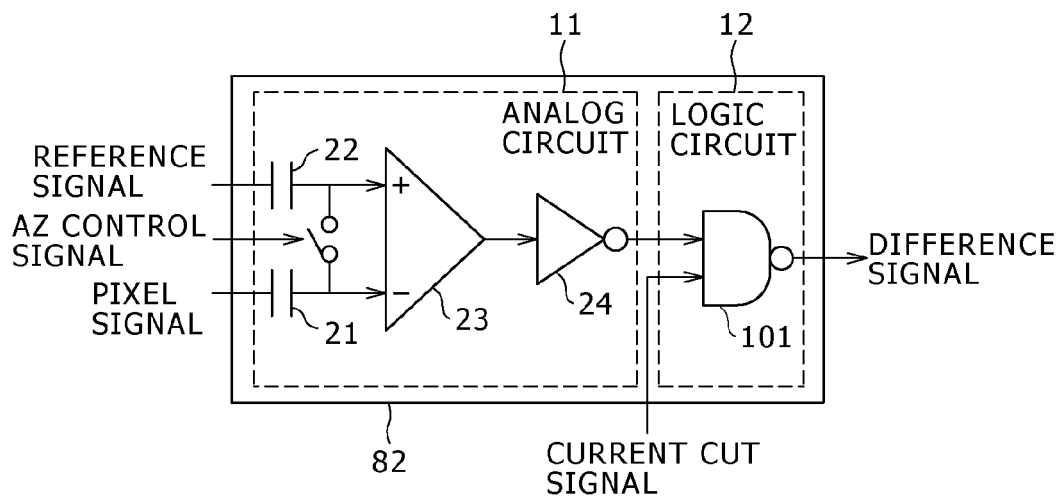
FIG. 5 is a schematic diagram showing a detailed configuration of a voltage comparing unit of FIG. 4.

FIG. 5 is a schematic diagram showing a detailed configuration of the voltage comparing unit (comparator) 82 in the solid-state imaging device 51 of FIG. 4.

In FIG. 5, the same reference numerals are given to parts corresponding to those in the voltage comparing unit 3 of FIG. 2. Namely, the voltage comparing unit 82 of FIG. 5 includes an analog circuit 11 and a logic circuit 12 similarly to the voltage comparing unit 3. The analog circuit 11 has a configuration similar to that of the voltage comparing unit 3.

Accordingly, a comparator 23 outputs a difference signal obtained by comparing a pixel signal from a unit pixel 60 with a reference signal from the DAC 64a, and an inverter 24 inverts and amplifies the difference signal and outputs the resultant signal to the logic circuit 12.

Meanwhile, the logic circuit 12 includes a NAND circuit 101 in place of the inverter 25 in the voltage comparing unit 3 of FIG. 2. The difference signal from the inverter 24 of the analog circuit 11 and a current cut signal from the communication/timing control unit 68 are inputted to the NAND circuit 101, and the NAND circuit 101 outputs the two-input NAND.

The AZ control signal for canceling an input offset between the pixel signal and the reference signal, and the current cut signal supplied to the NAND circuit 101 both are supplied from the communication/timing control unit 68.

Figure 6:
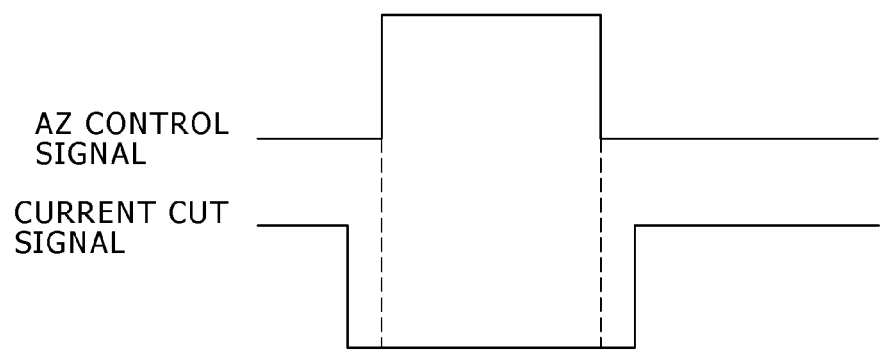
FIG. 6 is a diagram showing a relationship between an AZ control signal and a current cut signal.
Figure 7A:
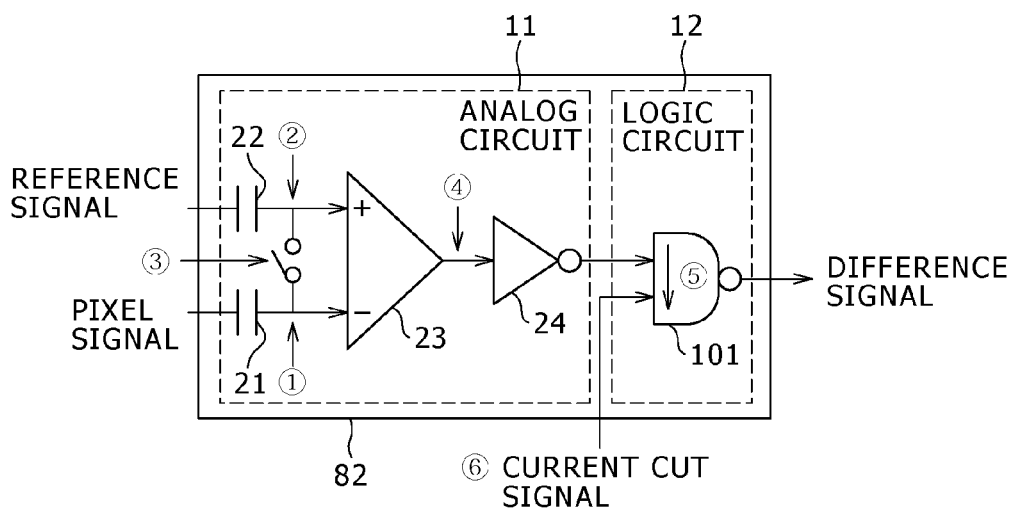
FIGS. 7A and 7B are diagrams each illustrating effects of the current cut signal.

FIG. 6 shows a relationship between the AZ control signal and the current cut signal. The communication/timing control unit 68 supplies such a current cut signal to the NAND circuit 101 as to cause the AZ control signal to go Lo at least during a period (input offset canceling period) in which the AZ control signal is Hi. FIG. 7A is a schematic diagram showing a configuration of the voltage comparing unit 82, and FIG. 7B is a waveform diagram showing the circuit operation of a pixel.

Since the NAND circuit 101 may be configured by connecting an AND circuit to an inverter (NOT circuit), it can be considered that the logic circuit 12 of the voltage comparing unit 82 of FIG. 5 is provided with an AND circuit having inputs connected to outputs of the difference signal from the inverter 24 and the current cut signal, and is located at the previous stage of the inverter 25 of FIG. 2. In this case, as long as the current cut signal is Lo, the difference signal from the inverter 24 is not supplied to the inverter at the subsequent stage.

Figure 7B:
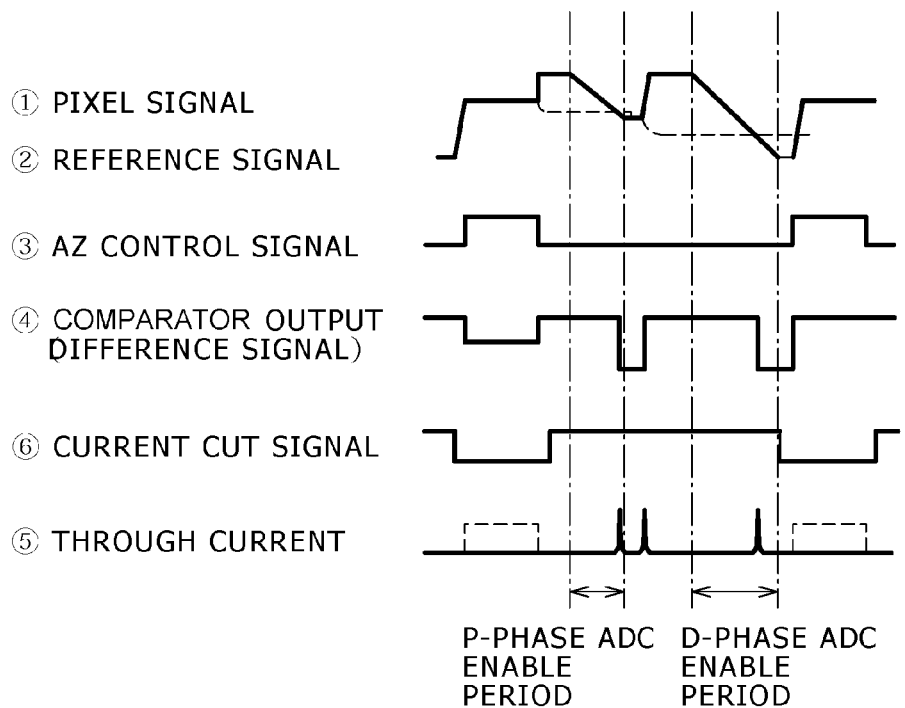

Accordingly, as shown in FIGS. 7A and 7B, a through current (portion indicated by a dotted line), which has been generated during the period (input offset canceling period) in which the AZ control signal is Hi in the logic circuit 12 of FIG. 2, is not generated in the NAND circuit 101. Namely, according to the voltage comparing unit 82 in FIG. 5, the through current can be suppressed, thereby reducing power consumption of the solid-state imaging device 51 as a whole.

The facts that the difference signal itself is not outputted from the voltage comparing unit 82 as long as the current cut signal is Lo, and that the difference signal can be outputted from the voltage comparing unit 82 when the current cut signal is Hi mean, in other words, that the current cut signal is an output enable signal masking output of the difference signal to the subsequent counter unit 83, and that the NAND circuit 101 is considered to also have a function as a masking circuit which masks an output of the difference signal to the counter unit 83.

The NAND circuit is used as a circuit serving both as the masking function of masking output of the difference signal to the counter unit 83 and the function as the inverter 25 of FIG. 2 in the above-described embodiment. However, any other circuit configuration may alternatively be used as long as these two functions can be achieved.

From the viewpoint of suppressing a through current attributable to an intermediate potential difference signal, it may suffice that the current cut signal is Lo at least only during periods in which the pixel signal and the reference signal both have the same potential. However, from the viewpoint of how long the current cut signal can be kept Lo at the maximum, the current cut signal can be kept Lo during any period other than the P-phase ADC enable period and the D-phase ADC enable period, since it is necessary to output a correct difference signal only during a period in which the counter unit 83 in the subsequent stage of the voltage comparing unit 82 is performing the down-count operation or the up-count operation.

Figure 8:
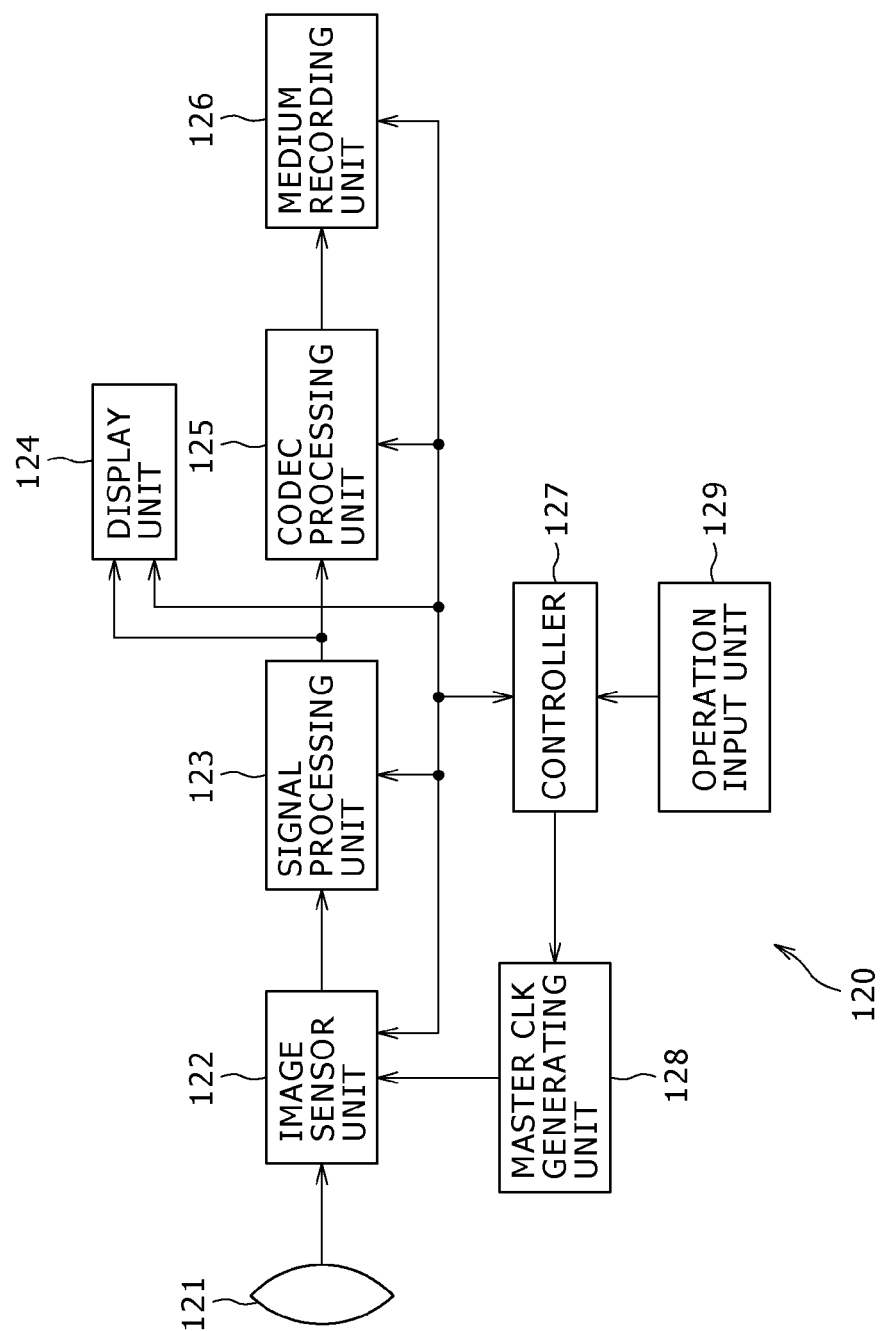
FIG. 8 is a block diagram showing a configuration example of an embodiment of an imaging apparatus to which an embodiment of the present invention is applied.

FIG. 8 is a block diagram showing a configuration example of an imaging apparatus 120 employing the solid-state imaging device 51 of FIG. 4. The imaging apparatus 120 may take either one or both of still images and moving images.

The imaging apparatus 120 includes a lens 121 including a zoom optical system, an image sensor unit 122 employing the solid-state imaging device of FIG. 4, a signal processing unit 123, a display unit 124, a codec processing unit 125, a storage medium unit 126, a controller 127, a master CLK generating unit 128, and an operation input unit 129.

Based on a control signal from the controller 127, the image sensor unit 122 supplies an image capture signal (signal corresponding to n-bit pixel data) obtained by taking an image, to the signal processing unit 123.

The signal processing unit 123 performs predetermined signal processing, such as white balance processing, gamma correction processing, and color separation processing, with respect to the supplied image capture signal, and supplies the resultant signal to the display unit 124 and the codec processing unit 125. The signal processing unit 123 may perform the signal processing with respect to the display unit 124 and the codec processing unit 125 independently of each other.

The display unit 124 includes, e.g., an LCD (Liquid Crystal Display) and the like, and displays the image capture signal from the signal processing unit 123 as an image. The codec processing unit 125 compresses the image capture signal from the signal processing unit 123 using a predetermined compression scheme, and supplies the compressed signal to the medium recording unit 126. On the basis of control by the controller 127, the medium recording unit 126 stores the image capture signal from the signal processing unit 123 on a storage medium, for example, a semiconductor memory, a magnetic disk, a magneto-optical disc, an optical disc, and the like. This storage medium may be attachable to and detachable from the imaging apparatus 120.

The controller 127 controls the image sensor unit 122, signal processing unit 123, display unit 124, codec processing unit 125, medium recording unit 126, and master CLK generating unit 128, on the basis of a user operation inputted from the operation input unit 129.

The master CLK generating unit 128 generates a main CLK, and supplies the main CLK to the image sensor unit 122. The operation input unit 129 includes a shutter button for commanding imaging, and other components, e.g., a jog dial, keys, levers, buttons, or a touch panel, and supplies an operation signal corresponding to a user operation to the controller 127.

Since the solid-state imaging device 51 of FIG. 4 is employed as the image sensor unit 122 even in the imaging apparatus 120 constructed above, a through current flowing during the cancellation of an input offset between an image signal and a reference signal can be suppressed, and thus power consumption can be reduced.

The embodiments of the present invention are not limited to the above-mentioned ones, but the present invention may be modified in various ways without departure from the scope and spirit of the invention.

What is claimed is:

1. A solid-state imaging device which performs column parallel Analog-to-Digital (AD) conversion processing of analog pixel signals outputted from a plurality of pixels arranged in a two-dimensional matrix form, the solid-state imaging device comprising:
a comparing circuit configured to output a difference signal obtained by comparing each of the pixel signals output from the pixels with a reference signal having a ramp waveform;
an inverting circuit configured to invert a logic of the difference signal output from the comparing circuit; and
a masking circuit configured to mask an output signal of the inverting circuit during an input offset canceling period in which the comparing circuit is canceling an input offset between the pixel signal and the reference signal,
wherein,
the masking circuit masks the output signal during a period other than a pre-charge phase (P-phase) of the Analog-to-Digital Conversion (ADC) enable period and a data phase (D-phase) ADC enable period, the period including the input offset canceling period.

2. A driving control method for a solid-state imaging device including a comparing circuit configured to compare an analog pixel signal output from a pixel with a reference signal having a ramp waveform and output a difference signal obtained by the comparison, an inverting circuit configured to invert a logic of the difference signal output from the comparing circuit, and a masking circuit configured to mask an output signal of the inverting circuit during an input offset canceling period in which the comparing circuit is canceling an input offset between the pixel signal and the reference signal, thereby performing column parallel Analog-to-Digital (AD) conversion processing of a plurality of the pixels arranged in a two-dimensional matrix form, the method comprising the steps of:
canceling, in the comparing circuit, an input offset between the pixel signal and the reference signal; and
masking, in the masking circuit, the output signal of the inverting circuit during an input offset canceling period in which the comparing circuit is canceling the input offset,
wherein,
the masking circuit masks the output signal during a period other than a pre-charge phase (P-phase) of the Analog-to-Digital Conversion (ADC) enable period and a data phase (D-phase) ADC enable period, the period including the input offset canceling period.

3. An imaging apparatus comprising:
a solid-state imaging device configured to perform column parallel Analog-to-Digital (AD) conversion processing of analog pixel signals output from a plurality of pixels arranged in two-dimensional matrix form;
wherein,
the solid-state imaging device includes:
a comparing circuit configured to output a difference signal obtained by comparing each of the pixel signals output from the pixels with a reference signal having a ramp waveform;
an inverting circuit configured to invert a logic of the difference signal output from the comparing circuit; and
a masking circuit configured to mask an output signal of the inverting circuit during an input offset canceling period in which the comparing circuit is canceling an input offset between the pixel signal and the reference signal, and
the masking circuit masks the output signal during a period other than a pre-charge phase (P-phase) of the Analog-to-Digital Conversion (ADC) enable period and a data phase (D-phase) ADC enable period, the period including the input offset canceling period.

* * * * *

UNITED STATES PATENT AND TRADEMARK OFFICE
CERTIFICATE OF CORRECTION

| | | |
|---|---|---|
| PATENT NO. | : 8,072,518 B2 | Page 1 of 1 |
| APPLICATION NO. | : 12/235698 | |
| DATED | : December 6, 2011 | |
| INVENTOR(S) | : Yuichiro Araki et al. | |

It is certified that error appears in the above-identified patent and that said Letters Patent is hereby corrected as shown below:

On the Cover page of the patent:

(75) "Junichi Iutsuka, Nagasaki (JP)"

should be

(75) --Junichi Inutsuka, Nagasaki (JP)--

Signed and Sealed this
Tenth Day of April, 2012

David J. Kappos
*Director of the United States Patent and Trademark Office*